INVENTOR.
Keith F. Barnhardt
BY
George A. Grove
ATTORNEY

United States Patent Office 3,666,528
Patented May 30, 1972

3,666,528
METHOD OF APPLYING FILLED POLYIMIDE COMPOSITIONS TO INTERNAL CYLINDRICAL SURFACES
Keith F. Barnhardt, Indianapolis, Ind., assignor to General Motors Corporation, Detroit, Mich.
Filed July 16, 1968, Ser. No. 745,294
Int. Cl. B44d 1/34
U.S. Cl. 117—49                                      2 Claims

ABSTRACT OF THE DISCLOSURE

Certain filled polyimide compositions are disclosed in addition to a method of applying the same in coatings of substantial thickness to internal cylindrical surfaces of compressor housings, labyrinth seal bands and the like. In a preferred embodiment a mixture of a solution of polyimide precursors and talc are centrifugally cast onto a metallic cylindrical surface such that most of the solvent is evaporated and the precursors are partially cured so as to be structurally selfsustaining. The rotation of the article to be coated is stopped and the coating is further cured under the pressure of an inert atmosphere such that residual solvent and volatile curing reaction byproducts are evolved without blistering the coating.

---

The invention herein described was made in the course of work under a contract or subcontract thereunder with the Department of Defense.

This invention relates to polyimide synthetic resins which are resistant to high temperatures and more particularly it relates to a method of rotational molding filled polyimide resins in relatively thick void-free coatings.

The resistance of polyimide coatings to high temperatures is well recognized. In general, these materials are formed by the condensation reaction between a dianhydride and a diamine to form a high molecular weight molecule characterized by a plurality of imide linkages. Usually, complete curing of polyimide resins is accomplished at temperatures of the order of about 600° F. and cured resins have been demonstrated to be capable of withstanding temperatures of 600° F. and higher for long periods of time.

However, the fact that these resins are cured at such relatively high temperatures and are structurally and chemically stable at these temperatures has meant that they could not be formed in accordance with all of the same molding or casting techniques which are useful in connection with resins that are either curable or thermoplastic at markedly lower temperatures. It has been found, for example, that it is extremely difficult to form polyimide coatings of thicknesses greater than a few mils without forming blisters, voids or other imperfections in the coating. The cured polyimide resins are not readily deposited as a homogeneous coating on a substrate. Conventionally it has been found necessary to deposit a solution of polyimide precursors on a suitable substrate and then cure the precursors in place. However, the evaporation of the solvent and the volatile condensation reaction byproducts during the curing of the precursors has precluded the formation of void-free coatings greater than a few mils in thickness.

Accordingly, it is an object of the present invention to provide a method of depositing a mixture of a filler and a polyimide precursor solution on an internal cylindrical surface and curing the resin to obtain a filled polyimide coating of thicknesses up to about 30–40 mils. Coatings of this thickness have utility in many articles such as compressor sections of turbine engines where sealing layers may be expected to withstand temperatures of 600° F. or greater.

It is a further object of the present invention to provide a method of forming a filled polyimide coating on an internal cylindrical surface wherein the entire coating is formed in a single sequence of molding and curing steps, rather than by building up a coating through repetitive deposition operations.

It is a still further object of the present invention to provide a filled polyimide precursor composition which is suitable for forming by a rotational molding technique into a continuous, void-free coating layer of up to 30–40 mils thickness.

In accordance with a preferred embodiment of my invention, these and other objects are accomplished by first preparing a mixture of about two to three parts of a filler such as talc and one part of suitable polyimide precursor. It is well known that polyimide resins may be formed by reacting a suitable organic tetracarboxylic acid or acid dianhydride and a suitable organic primary diamine. If suitable proportions of tetracarboxylic acid and primary diamine have been employed the fully reacted product is generally a tough, heat resistant polyimide of high molecular weight. In order that the polyimide may be more readily obtained as articles of a predetermined configuration it is preferred to form or mold chemical precursors of the polyimide and subsequently cure the precursors rather than mold the fully cured polyimide itself. Conventionally, the polyimide precursors are either unreacted monomeric starting materials, or a monomeric or polymeric reaction product obtained from the partial reaction of the starting materials. In either case the starting materials are preferably employed in the form of a solution wherein the solids comprise 40–60% by weight thereof. The mixture of filler and precursor solution is a moldable material which may advantageously be formed into relatively thick layers on an internal cylindrical surface by centrifugal casting, the solvent removed and the precursor fully cured to a tough polyimide resin in accordance with my method. One class of polyimide precursors, and the general chemical reaction by which polyimides may be formed therefrom, particularly suitable for use in connection with my invention are fully described in British Pat. 1,058,390 which is hereby incorporated by reference. Other polyimide precursors may also be employed in connection with my invention, as will be described.

The mixture of precursor solution and filler is preheated to a suitable elevated temperature such as about 160°–180° F. to improve its flowability. A cylindrical member to be coated is also preheated to about the same temperature and adapted to be rotated about its longitudinal axis, preferably at a rate of about 500–3000 r.p.m. A cylindrical article such as a section of a compressor housing is initially rotated at a relatively low speed and a measured amount of the polyimide precursor-filler mixture is deposited on the internal cylindrical surface in accordance with conventional centrifugal casting techniques. Rotation is continued and the mixture is slowly heated under conditions whereby the major portion of the solvent is evaporated and the precursors are cured to a condition at which the resulting resin is structurally selfsustaining when rotation is stopped. At this stage the partially cured coating is of high density and void free and may have a uniform thickness of about 30–40 mils which is extraordinary for polyimide resins.

Rotation of the cylindrical member is stopped and further curing is obtained under static conditions. The coating is subjected to a gas such as argon, which is inert with respect to the polyimide prepolymer under a pressure of about two to six times normal atmospheric pressure. The coating is then further heated to an elevated temperature above that obtained during the rotational molding step whereby residual solvent is evolved together with most, if not all, of the volatile reaction products formed by the curing resin. Due to the pressure of the inert gas the evolution of the volatile materials is slow and uniform and curing is accomplished within the coating without blistering or void formation. When substantially all of the volatile evolution has ceased as indicated by the maintenance of a fairly constant pressure, the inert atmosphere and volatiles are released and the final curing accomplished in air by heating to the ultimate curing temperature usually about 600° F.

Other objects and advantages of the invention will become more apparent from the following detailed description wherein reference will be made to the attached drawings in which.

A detailed description of a preferred mode for practicing my method will further illustrate the invention.

A solution of a polyimide precursor in a suitable solvent such as xylene and N-methylpyrrolidone is obtained wherein the precursor makes up about 40–45% by weight of the solution. This polyimide precursor preferably is of the type described in the above-identified British patent. As described therein, a suitable precursor mixture comprises the diethyl ester of 3,4,3',4'-benzophenonetetracarboxylic acid and 4,4'-methylenedianiline in the molar ratio of one part of the tetrafunctional acid and 1.5 parts of the primary diamine. When these two materials are heated to a suitable temperature, they will react to form a cross linked relatively high molecular weight product in which the original tetrafunctional acid and diamine moieties are joined in long chains by a plurality of imide linkages and wherein the chains are cross linked by reaction of an amine group with the aromatic ketone groups present in the acid moiety. As a byproduct of the reaction of these two particular precursor materials water and ethyl alcohol are generated.

Figure 1:
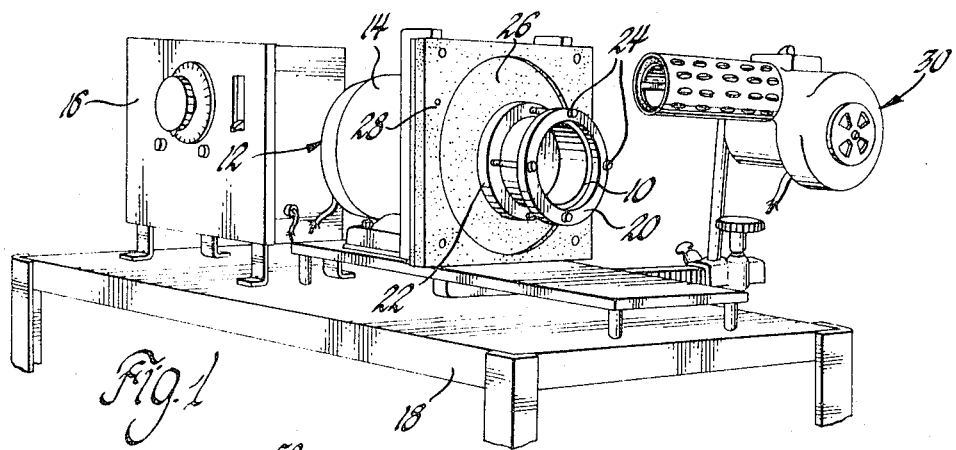
FIG. 1 shows a suitable arrangement of equipment for the rotational molding of a polyimide resin in accordance with the invention.

Talc was mixed with the precursor solution in a proportion of 2.4 parts per part of precursor. The mixture was stirred until it was uniform in consistency and then placed in a vacuum oven and heated to 150° F. The pressure within the oven was reduced to less than 1" of mercury whereby the mixture was freed of air and other volatile materials. The formulation was then removed from the oven and transferred to a glass medical syringe (without needle) for injection into a metal ring like that depicted at 10 in the drawings. The ring was nominally 4" in diameter 1⅜" in length and 0.062" thick. The metal ring was mounted in a suitable fixture on a casting machine shown generally at 12 in FIGS. 1 and 2.

Figure 2:
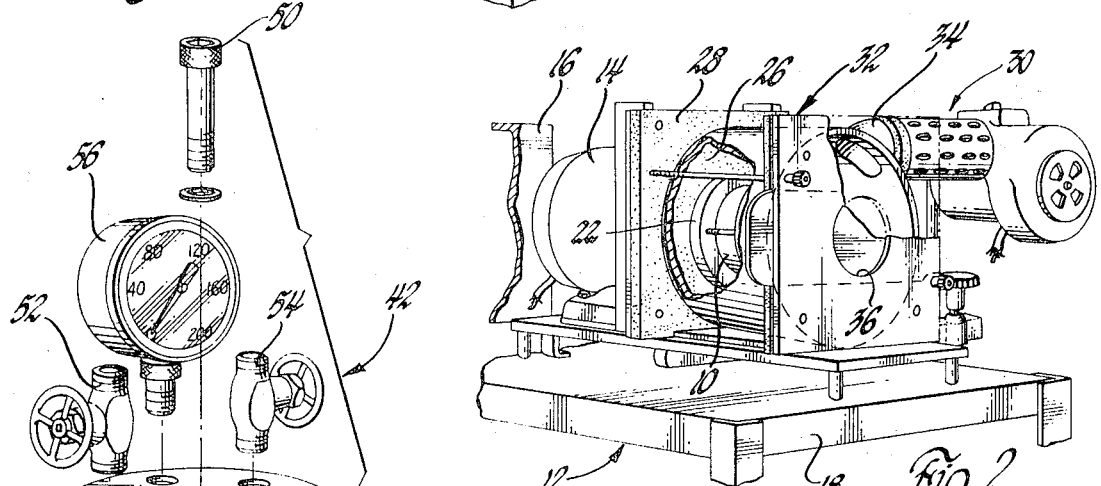
FIG. 2 shows a portion of the assembly of FIG. 1 with the addition of a suitable enclosure for heating the resin to a predetermined temperature.

In the apparatus shown casting machine 12 comprises a DC electric motor 14, the rate of rotation of which is suitably controlled by rheostat means 16. The motor 14, speed control 16 and other equipment to be described herein are mounted on a table 18. A fixture comprising flanges 20 and 22 and bolts 24 is provided to mount and support metal ring 10 for rotational casting operations. Flange 22 is mounted on the shaft (not shown) of DC motor 14 so as to rotate coaxially therewith and serves to enclose one end of metal ring 10 during casting operations. Stationary plate 28 has a recessed or cutaway portion 26 and a bore (not shown) through which the shaft of motor 10 extends and within which the shaft is free to rotate. Stationary plate 28 provides one wall of and the supporting retaining means for an oven which will be described in more detail in connection with heating the ring and moldable material during the casting operation. Since it is necessary to heat the polyimide precursor during a centrifugal casting operation, heating means 30 is provided in the form of a heating gun. This is a conventional commercially available device which is made up of a resistive heating element and blower means for directing air over the heating element so as to supply hot air for a particular heating requirement. As seen in FIG. 2, when the metal ring 10 has been mounted onto flange 22 it is enclosed by housing 32 which is bolted as shown to plate 28. Heating device 30 is connected to the housing through tube means 34 so that warm air may be blown into the housing around the outside of ring 10. Another opening, not shown in these figures, is provided in the housing 32 for venting. Opening 36 is provided in the end of housing 32 to permit the filler-polyimide precursor mixture to be introduced onto the internal cylindrical surface of metal ring 10. Closure means may be provided for opening 36 if desired.

A 4" steel ring was mounted on flange 22 as described above and housing 32 bolted into place. The ring was rotated by means of DC motor 14 at 550 r.p.m. and heated with heating device 30 to about 160° F. The deaerated and preheated mixture of polyimide precursor solution and talc was injected through opening 36 onto the internal cylindrical surface of ring 10. About seventeen grams of the talc-precursor mixture were employed, this amount being sufficient to form a finished coating of about 30 mils in thickness.

About two minutes after completion of the injection the rotational speed was steadily increased in a one minute period from 550 to 2700 r.p.m. The high rate of rotation was maintained for three minutes after which it was steadily decreased to 550 r.p.m. This rate was held for seventy minutes during which period the oven temperature was gradually increased from 160° F. to 175° F. The rate of rotation was again increased to 2700 r.p.m. for a period of about five minutes followed by a decrease to 650 r.p.m. for thirty minutes during which time the oven temperature was increased from 175°–205° F.

The purpose of the alternate increase and decrease of rotational rate is to mold the coating mixture into a layer of uniform thickness without causing substantial segregation of the filler (talc) in the curing resin toward the metal housing. Thus, the rotational speed is increased at a given temperature to accomplish the molding but decreased before further heating is undertaken to avoid migration of the talc in the warm and initially less viscous resin.

When the temperature had reached 205° F. the rotational speed was increased ot 1050 r.p.m. for a period of one hour and fifteen minutes during which time the temperature was increased from 205° to 225° F. The rate of rotation was increased to 2700 r.p.m. for two minutes and then decreased to 650 r.p.m. for a period of ninety minutes. The speed was increased for a fourth time to 2700 r.p.m. and held for six minutes followed by a return to 650 r.p.m. This speed was maintained for sixteen hours at a temperature of 228° F.±3° F. At this point the major portion of the solvent had evaporated and the resin mixture had cured to a condition at which it was selfsustaining when the rotation of the metal ring 10 was stopped.

Figure 3:
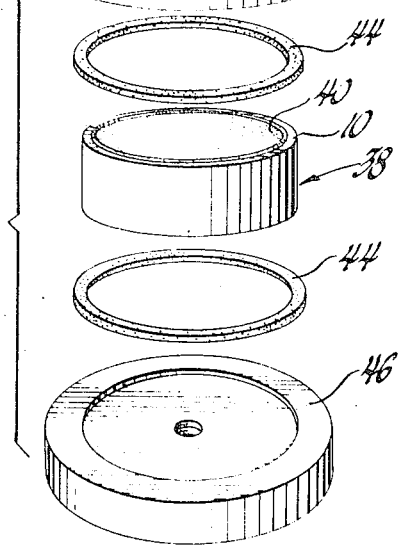
FIG. 3 is an exploded view depicting a suitable arrangement for heating the coating under an inert atmosphere.
Figure 4:
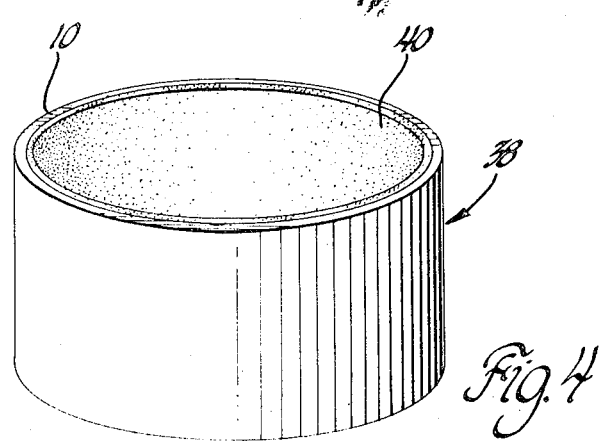
FIG. 4 is a view of metal ring having a thick cured polyimide coating on its internal cylindrical surface.

The resin coated ring composite 38 including ring 10 and molded resin coating 40 was cooled to room temperature, removed from the casting machine 12 and adapted as a simple pressure vessel 42 which is shown in FIG. 3 in an exploded view. Teflon seals 44 were placed above and below ring 38 and abutting the seals 44 were secured to a bottom plate 46 and top plate 48 by means of bolt 50. Top plate 48 is adapted to receive a gas inlet fitting and valve 52, a gas outlet fitting and valve 54 and a pressure gauge 56. Enclosed and adapted as described the resin coating 40 of coated ring 38 may be subjected to a special atmosphere while being heated in a conventional oven or furnace.

The assembled pressure vessel 42 as shown in FIG. 3 was purged with argon for two minutes. It was then pressurized with argon to 55 p.s.i. The pressurized assembly was placed into a suitable force draft oven which had previously been stabilized at 200° F. The temperature and pressure within the assembled pressure vessel were permitted to reach equilibrium with the oven over a period of thirty minutes during which time the pressure of the atmosphere acting on resin coating 40 increased to 59 p.s.i. During a period of thiry minutes the temperature was gradually raised to 240° F. which caused a pressure increase to 66 p.s.i. The temperature was held at 240° F. for one hour and forty-five minutes during which time the pressure increased from 66 to 73 p.s.i.

The increase in pressure under isothermal conditions indicated that volatiles such as residual solvent and curing reaction byproduct (water and ethyl alcohol) were being slowly evolved. The evolution of these byproducts from a relatively thick layer of curing resin has heretofore caused blistering of the resin and could have in this instance had the coating not been maintained under pressure. The application of gas pressure at this critical stage of the curing operation permits faster cures in a practical manner.

The forced draft oven temperature was increased steadily over a period of two hours from 240°-285° F., the pressure increasing in the vessel 42 correspondingly from 73-79 p.s.i. The temperature was maintained at 285° F. for thirty minutes during which time the pressure increased from 79-81 p.s.i. The temperature was then increased from 285° F. to 330° F. over a period of one hour and twenty minutes, the pressure increasing to 92 p.s.i. It was intended to further heat the assembly to a temperature of 350°-360° F. However, a leak developed in the pressure gauge which resulted in a complete loss of pressure in assembly 42 in about two minutes. Accordingly, the oven was turned off and the assembly permitted to cool gradually to room temperature. In general, it is preferred that the filled coating be heated during this second stage of my molding procedure under pressure to a temperature of about 350-360° F. When the assembly 42 was dismantled the coating 40 was found to be blister-free, smooth and of uniform thickness. The coated ring 38 was then placed into a forced draft oven at 150° F. for the third stage of my curing process. The temperature was immediately increased to about 325° F. over a period of thirty minutes. The coating was then given the following forced draft oven cure. The coating was heated for thirty minutes at 325° F., for two hours at 350° F., for one hour and forty-five minutes at 400° F. for sixteen hours (overnight) at 500° F. and for two hours at 600° F. Temperature changes to higher levels were carried out in each step over a period of thirty minutes. After the final heating period at 600° F. the coated ring 38 was allowed to slowly cool to room temperature.

The coating obtained by the process was evenly cast and free of irregularities. Coatings obtained in this manner, and of this and similar polyimide precursor-filler formulations, have been aged for fifty hours or more at 650° F. and subjected periodically to fifty thermal cycles (100 thermal shocks) to —65° F. and return to 600° F. At the end of this testing period the coatings were examined and found to display a remarkable lack of physical deterioration. These thick coatings of 30 to 40 mils appear to far exceed the properties of other known organic coatings heretofore employed as seal members in turbine engines and the like. It is expected that these and similar coatings will meet temperature requirements of 700°-800° F. for short durations and will withstand the drastic changes in temperatures encountered in turbine engines during start-up and shut-down. The coatings of this type are useful as abradable seals on the internal cylindrical surface of compressor housings. In this application the seals prevent the flow of air over the tip of the rotor blade. In a similar application the seals are employed as abradable coatings in labyrinth seals which are also used in the compressor section of a turbine engine. Other applications will be apparent to those having the need for high temperature resistant seal compositions of substantial thickness up to 30–40 mils.

The detailed description of a mode of practicing my method set forth above was of an actual experiment. It will be apparent that the heating cycles can be shortened somewhat since in many instances it was required to allow the experiment to proceed overnight without instrumentation for increasing or decreasing the temperature or rate of rotation. In general, however, the method of my invention involves first centrifugally casting a mixture of filler and polyimide precursor onto a suitable internal cylindrical surface. The centrifugal forces are employed to mold the resin into a layer of uniform thickness while at the same time the coating is slowly heated to remove the solvent and partially cure the precursor composition. As described by the above example, the temperature was increased stepwise during the rotational casting to a maximum temperature of about 230° F. at which point the solvent had substantially all evaporated. During the stepwise increases in temperature the rate of rotation was alternately increased and decreased to mold the resin without affecting excessive migration of the sample. It will be appreciated that this operation could be accomplished in a number of ways such as by slowly and uniformly increasing both the temperature and the rate of rotation. The basic object to be accomplished is that the mixture be rotationally molded and the solvent eliminated without blistering the coating.

When the coating has been molded and the major portion of the solvent removed, further curing is accomplished under static conditions. However, since some residual solvent may be present and since byproducts of the curing reaction are volatile at curing temperatures, it is necessary to maintain substantial pressure on the coating during curing operation to effect the slow and uniform evolution of vapor molecules. This is necessary when coatings of substantial thickness are being cured so that no bubbles or voids are formed in the coating. The pressure of an inert gas which does not adversely interfere with the curing operation or form undesirable byproducts reduces the rate of volatilization and tends to make it more uniform whereby blistering is eliminated. Preferably, the pressure maintained on the coating at this stage of the curing process is about two to six times normal atmospheric pressure. This may be accomplished by subjecting the molded resin to the pressure of an inert gas in a closed container and allowing the pressure to increase as volatiles are evolved due to further heating. This procedure was illustrated in the above-described example. In a different technique the closed container may be periodically vented during this heating step to maintain the internal pressure at a suitable value above atmospheric pressure even though curing reaction byproducts are being evolved. In this way the absolute pressure required to obtain the benefits of my process may be minimized at a suitable low level. I have also found it desirable to periodically purge the pressure vessel by adding inert gas under pressure and simultaneously venting thereby removing undesirable curing reaction byproducts which might tend to hydrolyze or otherwise degrade the coating. It is noted, however, that this purging is accomplished by maintaining the system at a suitable pressure above normal atmospheric pressure. Thus, it is seen that one of a number of variations may be employed in accordance with this stage of my process without departing from the basic concept of maintaining the curing resin under pressure. When the bulk of the volatiles have been removed and a major portion of the curing is complete, which is typically accomplished at a temperature of 330°–360° F., the balance of curing may be accomplished in a normal oven or furnace without unusual precautions.

In general, the polyimide precursor may be filled with any of a number of conventional materials such as talc, mica, silica, alumina, graphite and the like, alone or in combination. However, talc alone or in combination is preferred because it has been found to impart excellent physical properties in combination with the cured resin. The specific proportion of filler material to polyimide precursor in the initial formulation may be determined by experiment to meet the requirements of a particular application. In general, the upper limit of the filler that is employed is reached when the filler resin mixture becomes so stiff as to become incapable of being molded. However, some filler material is usually required to retard or eliminate shrinkage of the resin upon curing and debonding thereof from the internal cylindrical surface against which it has been cast. In the case in which talc is employed as a filler with the above-described polyimide precursor, I have found that a range of two to three parts of talc per part of precursor is suitable. I have also found that mixtures of talc and graphite are particularly useful as a filler combination. Filler mixtures of two parts of talc per part of graphite may be incorporated in precursor solutions in the above-defined ranges for talc.

It is now apparent that my process would be of use in the molding (or casting) and curing of any resin which generates gaseous byproducts during curing and at the same time is quite viscous so as to retard the complete and uniform evolution of said byproducts. However, as described herein, my method is particularly useful in casting and curing polyimide resins. In this regard, any of a number of polyimide precursor materials may be employed in addition to unreacted polyimide forming compositions such as those set forth above. My method may be practiced with partially reacted polyimide forming materials such as the polyamide-acid compositions described in U.S. Pats. 2,867,609, 3,179,614 and 3,179,633. In addition, diamine salts of tetracarboxylic diesters such as are described in U.S. Pat. 2,880,230 are also suitable materials for molding in accordance with my invention.

Accordingly, while my invention has been described in the terms of a preferred embodiment thereof it is apparent that modifications thereof can readily be adapted by one skilled in the art and therefore the scope of my invention is to be considered limited only by the following claims.

I claim:

1. A method of forming a filled polyimide resin coating on an internal cylindrical surface, the thickness of said coating being up to about 30–40 mils, said method comprising
    providing a mixture of a solution of polyimide precursor and a filler;
    heating said mixture to a first elevated temperature in the range of about 150°–180° F. to increase the flowability of said mixture;
    rotating a cylindrical member to be coated about its longitudinal axis at a rate of about 500–3000 r.p.m. and heating said member to approximately the same elevated temperature as said mixture;
    casting said mixture onto the internal cylindrical surface of said rotating member to form a coating of substantially uniform thickness;
    slowly heating said coating so as to increase the temperature thereof stepwise to a second elevated temperature greater than said first elevated temperature but less than about 600° F., the rate of rotation of said member being increased within said range to a maximum at each stepwise temperature increase and then decreased to a lower rate before a further temperature increase is accomplished whereby a major portion of the solvent is evaporated and said resin is partially cured so as to be self-sustaining without the formation of voids or blisters in the resin-filler coating;
    stopping the rotation of the coated member;
    subjecting said coating to an inert gas under an initial absolute pressure of about two to six times normal atmospheric pressure;
    slowly heating said coating in the presence of said inert gas to a third elevated temperature, greater than said second elevated temperature but less than about 600° F., whereby residual solvent is removed and the major portion of volatile curing reaction byproducts are evolved from said curing resin without causing blistering of said coating;
    releasing said inert gas and volatile materials;
    and heating said coating to a fourth elevated temperature, greater than said third elevated temperature but not greater than about 620° F., to complete the curing of said polyimide resin whereby a smooth, void-free relatively thick coating is formed on said internal cylindrical surface.

2. A method of forming a filled polyimide resin coating on an internal cylindrical surface, the thickness of said coating being up to about 30–40 mils, said method comprising:
    providing a mixture of a solution of polyimide precursor and a filler;
    heating said mixture to a temperature in the range of about 150°–180° F. to increase the flowability of said mixture;
    rotating a cylindrical member to be coated at a rate of about 500–3000 r.p.m. and heating said member to approximately the same elevated temperature as said mixture;
    casting said mixture onto the internal cylindrical surface of said rotating member to form a coating thereon of substantially uniform thickness;
    slowly heating said coating so as to increase the temperature thereof stepwise to about 230° F.±15° F., the rate of rotation of said member being increased within said range to a maximum at each stepwise temperature increase and then decreased to a lower rate before a further temperature increase is accomplished whereby the major portion of solvent is evaporated and said resin is partially cured so as to be self-substaining when rotation is discontinued;

stopping the rotation of the coated member;

subjecting said coating to an inert gas under an initial absolute pressure of about two to six times normal atmospheric pressure;

slowly heating said coating in the atmosphere of said inert gas to a temperature of 330° F.±15° F. whereby residual solvent is removed and the major portion of curing reaction volatile byproducts are evolved from said curing resin without causing blistering of said coating;

releasing said inert gas and volatile material;

and slowly heating said coating to a temperature of about 600° F.±20° F. to complete the curing of said polyimide resin whereby a smooth, void-free, relatively thick coating is formed on said internal cylindrical surface.

References Cited
UNITED STATES PATENTS

| | | | |
|---|---|---|---|
| 2,923,640 | 2/1960 | Buckingham | 117—101 |
| 3,369,922 | 2/1968 | Surchek | 117—49 |

RALPH S. KENDALL, Primary Examiner

J. A. BELL, Assistant Examiner

U.S. Cl. X.R.

117—97, 101; 264—270, 310, 311